April 3, 1928.
H. A. NELSON
TRIMMER
Filed July 26, 1927
1,665,109
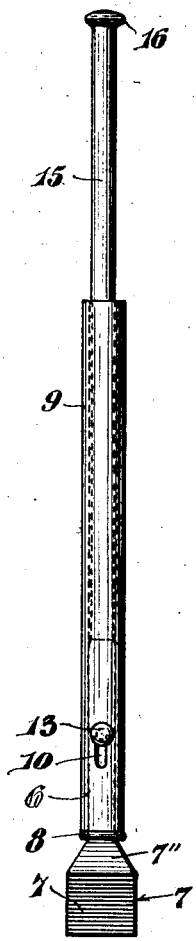
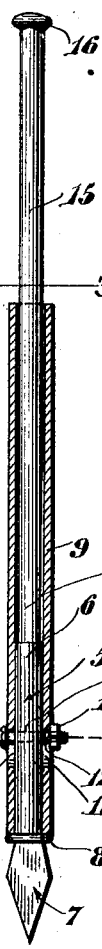
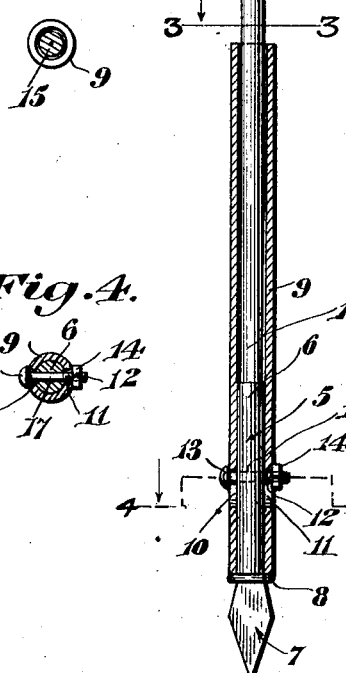
Henry A. Nelson, INVENTOR.
BY
Geo. F. Kimmel, ATTORNEY.

Patented Apr. 3, 1928.

1,665,109

UNITED STATES PATENT OFFICE.

HENRY A. NELSON, OF BIJOU HILLS, SOUTH DAKOTA.

TRIMMER.

Application filed July 26, 1927. Serial No. 208,583.

This invention relates to a trimmer, and has for its object to provide, in a manner as hereinafter set forth, a device of such class for efficiently and expeditiously trimming hoofs, limbs on trees, bolt heads, rivets, etc., and further whereby the device may be employed as a wedge or pry when desired.

Further objects of the invention are to provide, in a manner as hereinafter set forth, a trimmer for the purpose referred to which is simple in its construction and arrangement, strong, durable, thoroughly efficient when used, conveniently operated, readily assembled, and comparatively inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is an elevation of a trimmer in accordance with this invention.

Figure 2 is a longitudinal section thereof.

Figure 3 is a section on line 3—3 Figure 2.

Figure 4 is a section on line 4—4 Figure 2.

Referring to the drawings in detail a trimmer element, in the form of a chisel, is indicated generally by the reference character 5, and which includes a shank 6, of any suitable cross section, preferably cylindrical and said element further includes a trimmer head 7 formed of a wide outer portion 7' and a reduced inner portion 7''. The outer portion 7' is of rectangular contour and its front and rear faces incline toward each other from the point of joinder of said portion 7' with the inner portion 7''. The inner portion 7'' is of tapered contour and has its side edges incline toward each other from the point of joinder of said portion 7'' with the portion 7'. The front and rear faces of the portion 7'' incline toward each other from the point of joinder of said portion 7'' with the portion 7'. The shape of the portion 7'' is of pyramidal contour and has its inner end or top materially reduced with respect to the outer end of portion 7'. The reduced end of the portion 7'' is integral with and of a width substantially the same as the diameter of the outer end of the shank 6. At the point of joinder of the portion 7'' with the outer end of the shank 6 an abutment is arranged, and which consists of a laterally disposed, relatively thin, rounded, solid, annular flange 8, which is of greater diameter than the shank 6 and reduced end of the portion 7''. The flange 8 is also of a diameter greater than the diameter of a carrier to be presently referred to.

The shank 6 extends into a tubular carrier 9 from one end of the latter. The flange 8 directly abuts that end of carrier 9 through which the shank 6 extends. The element 5 is slidably connected to the carrier 9 and for such purpose the latter is formed with a pair of diametrically disposed, lengthwise extending slots 10, 11 of appropriate length and which have their outer ends positioned in proximity to the flange 8. Extending through the shank 6, as well as being connected therewith, in any suitable manner, is a bolt 12, provided at one end with a head 13 and at its other end with a nut 14 having threaded engagement therewith. The bolt 12 is of a length to extend through the slots 10, 11 and the head 13 is positioned against the outer periphery of the carrier 9 and the nut 14 is arranged in like relation.

Extending within the carrier 9, from the other end thereof, is a plunger bar 15, having its contour in cross section, corresponding to the contour of the inner face of the carrier 9. Preferably the plunger bar 15 is slightly less diameter than the diameter of the shank 6. The plunger bar 15 is of greater length than the length of the carrier 9 and when seated on the shank 6, projects a substantial distance from the upper end of the carrier 9, so that the bar 15 can be readily grasped by the operator. The upper or outer end of the plunger bar 15 is formed with a head 16.

By reciprocating the bar 15, within the carrier 9, it will impact with the shank 6, and provide for the functioning of the trimmer head which is positioned against the object to be trimmed. Preferably the width of the trimmer head is greater than the outer diameter of the carrier 9. The shank 6 is provided with a diametrically disposed opening 17 through which the bolt 12 extends and with the latter snugly fitting the wall of the opening. Other than providing the shank 6 with the opening 17, the remaining portion thereof is solid. The flange 8 prevents the carrier 9 from slipping down on the trimmer head 7. The slots 10, 11 provide for rebound of the trimmer element 5 with respect to the carrier.

It is thought the many advantages of a trimmer, in accordance with this invention can be readily understood, and although the preferred embodiment thereof is as illustrated and described, yet it is to be understood that changes in the details of construction can be had which will fall within the scope of the invention as claimed.

What I claim is:

1. A trimmer comprising a tubular carrier open at each end and formed in proximity to one end with a pair of diametrically opposed lengthwise extending slots, a trimmer head positioned exteriorly of said end and having a reduced inner end, a shank integral with said reduced inner end and extending into the carrier from the said end thereof, a laterally extending, annular, solid abutment integral with the shank and head at the point of joinder of the shank with said reduced end and directly abutting against said end of the carrier to prevent the latter sliding upon the head, means carried by the shank, coacting with said slots and sliding against the outer periphery of the carrier for slidably connecting the shank to the carrier, and a plunger rod extending into the carrier for impacting the inner end of the shank to provide for the head performing its trimming function.

2. A trimmer comprising a tubular carrier provided with a pair of opposed lengthwise extending slots, a shank arranged within the carrier and having a diametrically extending opening, a headed bolt extending through said slots and opening, and extending from one of the slots, a nut mounted on the extended end of the bolt, a trimmer head arranged exteriorly of the carrier and having a reduced inner end integral with the outer end of the shank, and a laterally extending, annular, solid flange integral with the shank and head at the point of joinder of the shank with said inner end and providing an abutment for direct engagement by the carrier to prevent the latter sliding upon the head.

3. A trimmer comprising a carrier, a shiftable shank arranged within the latter, said shank and carrier having coacting means sliding against the outer periphery of the carrier for slidably coupling the shank to the latter, a trimmer head arranged exteriorly of the carrier and having a reduced inner end integral with the outer end of the shank, and a laterally extending, annular, solid flange integral with the shank and head at the point of joinder of the shank with said inner end and providing an abutment for direct engagement by the carrier to prevent the latter sliding upon the head.

In testimony whereof, I affix my signature hereto.

HENRY A. NELSON.